United States Patent
Corbetta et al.

(10) Patent No.: US 7,044,436 B2
(45) Date of Patent: May 16, 2006

(54) REGULATION VALVE

(75) Inventors: Antonio Corbetta, Cadorago (IT); Antonello Vago, Cermenate (IT)

(73) Assignee: Pibiviesse S.p.A., Nerviano (IT)

( * ) Notice: Subject to any disclaimer, the term of this patent is extended or adjusted under 35 U.S.C. 154(b) by 0 days.

(21) Appl. No.: 10/806,100

(22) Filed: Mar. 23, 2004

(65) Prior Publication Data

US 2004/0217312 A1 Nov. 4, 2004

(30) Foreign Application Priority Data

Apr. 30, 2003 (IT) .......................... MI2003A0889

(51) Int. Cl.
*F16K 47/00* (2006.01)
*F16L 55/02* (2006.01)

(52) U.S. Cl. ................. 251/127; 251/120; 251/315.01; 137/625.31

(58) Field of Classification Search ................. 251/118, 251/120, 121, 127, 315.01; 137/625.3, 625.31, 137/625.32

See application file for complete search history.

(56) References Cited

U.S. PATENT DOCUMENTS 3,529,628 A * 9/1970 Cummins ................. 137/625.3
4,364,415 A 12/1982 Polon .......................... 137/625
4,889,163 A * 12/1989 Engelbertsson ........ 137/625.32
5,509,446 A 4/1996 Bey ............................ 137/625
5,524,863 A 6/1996 Davis ......................... 251/127
6,868,865 B1 * 3/2005 Tran ...................... 137/625.32

FOREIGN PATENT DOCUMENTS

EP 0831262 A2 3/1998

* cited by examiner

*Primary Examiner*—Edward K. Look
*Assistant Examiner*—John K. Fristoe, Jr.
(74) *Attorney, Agent, or Firm*—Jacobson Holman PLLC

(57) ABSTRACT

A ball valve for fluids comprises a body (11) provided with an inlet and an outlet (12, 13) and with an inner chamber (14) in which a ball element (15) having a main communication passageway (17) passing through the ball element itself is rotatably received. The ball element is rotatable between an angular position at which the valve is completely closed, said passageway being disposed substantially transverse to the inlet and outlet, and an angular position at which the valve is completely open, said main passageway being aligned with the valve inlet and outlet to create a communication therebetween. The ball element (15) comprises a secondary communication passageway (19) of a reduced section disposed laterally of said main communication passageway. The secondary passageway is designed to bring the valve inlet and outlet into communication with each other when said ball element is in a range of intermediate angular positions between said completely open and completely closed positions.

14 Claims, 1 Drawing Sheet

REGULATION VALVE

BACKGROUND OF THE INVENTION

1. Field of the Invention

The present invention relates to an innovative regulation valve of the ball type. Known in the art, above all when gaseous fluids are used, are the problems connected with ball valves in the opening and closing transients and in the intermediate positions for flow regulation.

2. State of the Prior Art

In an attempt to improve the performance of these valves several different solutions have been proposed in the known art. For example, insertion of suitable perforated baffles into the duct passing through the ball element has been suggested so as to partially close part of the entrance of such a duct. This partly closed and perforated region should supply an improved regulation at the intermediate rotation positions of the ball. Unfortunately, this solution eliminates the possibility of having a fully open valve, the perforated baffle partly obstructing the duct. In addition, due to the particular shape of the attachment edges formed by the perforated baffle and the passages therein present, under some operating conditions unacceptable vibrations and whistles are generated, above all at high speeds of the fluid.

It is a general aim of the present invention to obviate the drawbacks of known ball valves, by providing a ball valve not only allowing an ON/OFF operation, but also offering the possibility of regulating the flow with high differential pressures or lower differential pressures but a high useful regulation angle, all that with a simple and sturdy structure operation of which is satisfactorily noiseless even at high fluid speeds.

SUMMARY OF THE INVENTION

In view of the above aim, in accordance with the invention, a ball valve for fluids has been conceived which comprises a body provided with an inlet and an outlet and with an inner chamber in which a ball element having a main communication passageway passing through the ball element itself is rotatably received, the ball element being rotatable between an angular position at which the valve is completely closed, said passageway being disposed substantially transverse to the inlet and outlet and an angular position at which the valve is completely open, said main passageway being aligned with the valve inlet and outlet to create a communication therebetween, characterized in that the ball element comprises a secondary communication passageway of reduced section disposed laterally of said main communication passageway, the secondary passageway being designed to bring the valve inlet and outlet into communication with each other when said ball element is in a range of intermediate angular positions between said fully open and fully closed positions.

BRIEF DESCRIPTION OF THE DRAWINGS

For better explaining the innovative principles of the present invention and the advantages it offers over the known art, a possible exemplary embodiment applying said principles will be described hereinafter, with the aid of the accompanying drawings. In the drawings:.

DETAILED DESCRIPTION OF THE INVENTION

Figure 1:
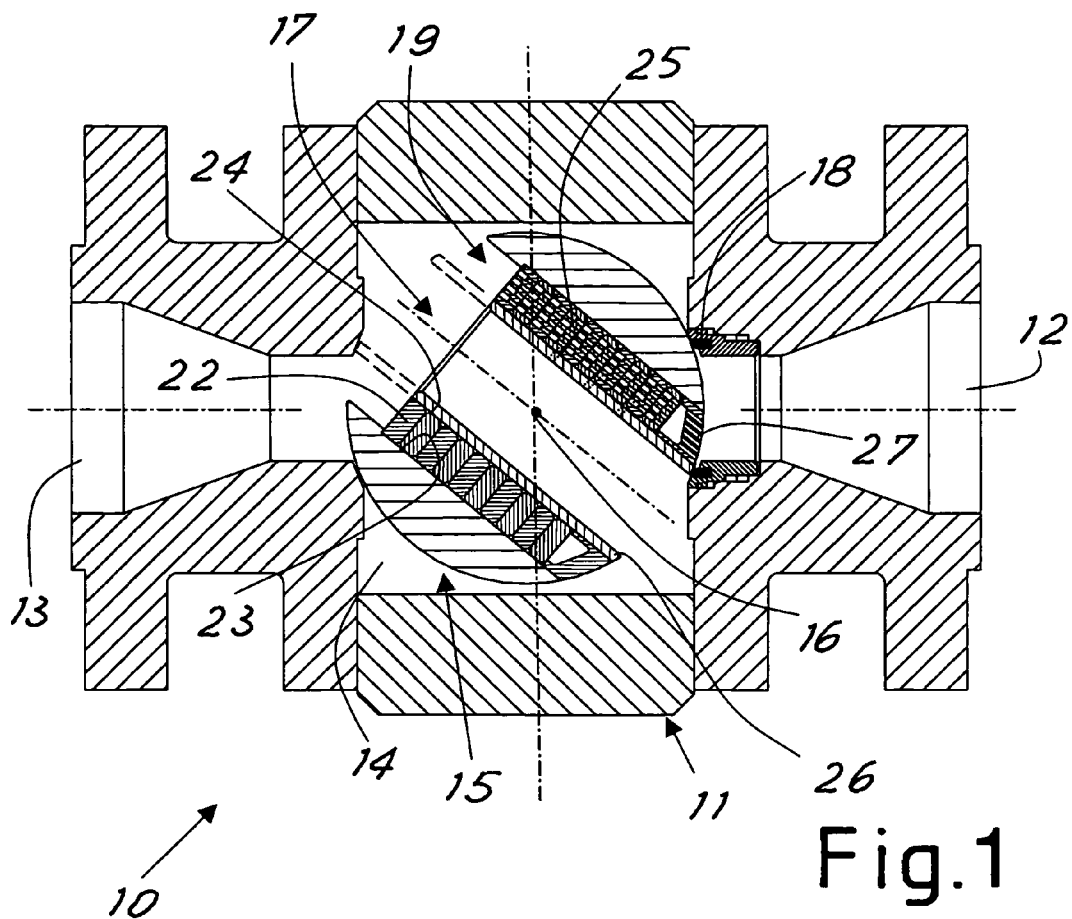
FIG. 1 is a diagrammatic sectioned view of a valve in accordance with the invention.

With reference to the drawings, a ball valve for fluids, in particular gases, is shown in FIG. 1 and generally denoted at 10. The valve comprises a body 11 provided with an inlet 12 and an outlet 13, disposed coaxial at the opposite ends of an inner chamber 14 in which a ball shutoff element 15 is rotatably received. The ball element is rotatable through known means not shown, around its axis 16 and is provided with a main communication passageway 17 passing through it. Known hydraulic-sealing elements 18 are provided between the ball element and chamber.

In this way, the ball element is rotatable between an angular position at which the valve is fully closed, said passageway 17 having an axis disposed substantially transverse to the common inlet and outlet axis, and an angular position at which the valve is fully open, the main passageway 17 being aligned with the valve inlet and outlet to constitute a communication therebetween.

The main passageway 17 advantageously has a diameter substantially close to the opening diameter of the inlet and outlet ducts 12 and 13 into the chamber.

In addition to the main passageway 17, the ball element 15 comprises a separated secondary communication passageway 19 of a reduced section as compared with the main passageway and disposed parallel and lateral to the main passageway. As clearly shown in FIG. 1, the secondary passageway 19 is designed to bring the valve inlet and outlet into communication with each other when said ball element is in a range of intermediate angular positions between the above mentioned fully open and fully closed positions.

Advantageously, the secondary passageway 19 comprises a plurality of paths for the fluid that are preferably tortuous, to dissipate a high amount of the fluid energy and consequently generate an important pressure difference between the valve inlet and outlet when the ball element is in said range of intermediate angular positions. Depending on requirements, the pressure difference may also reach very high values by giving suitable sizes to the paths.

Figure 2:
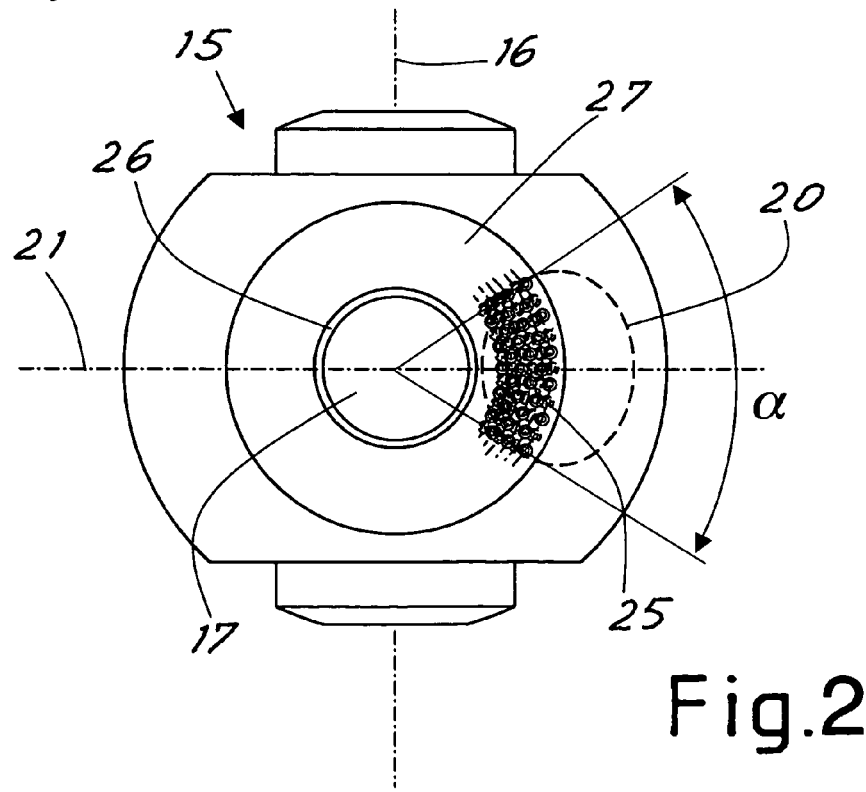
FIG. 2 is a front view of the ball element of the valve in FIG. 1.

As well apparent in FIG. 2, the secondary passageway has a cross section extending at an angle around said main passageway. The extension may have an angle α included between 0° and 360°, advantageously between 45° and 180° and, preferably, approximately of 90° around the central passageway.

The extension angle of the small holes of the secondary passageway can be different for the individual sectors so as to enable expansion of the compressible fluids along the secondary passageway. It may be therefore useful that the perforated area on the spherical surface should extend according to different shapes and angles depending on the type of service and that said perforated area be included between 0° and about 90° because it is not required for the extension to be greater than the seat, but it is necessary that in the subsequent sectors it may angularly extend until covering the whole circumference.

For example, the selected angle can be of such a magnitude that the side passage section extends over the whole clearance 20 (diagrammatically shown in chain line in FIG. 2) for passage of the fluid through the inlet of the communication ducts 12, 13 into the chamber.

As still shown in FIG. 2, the secondary passageway 19 has a cross section extending symmetrically in an arc-shaped configuration with respect to a median plane 21 of the ball element that is transverse to the rotation axis 16.

Referring again to FIG. 1, in an advantageous embodiment of the valve in accordance with the present invention, the valve comprises a toroidal element 22 inserted in a seat 23 in the ball element with an axis coincident with the axis of the main passageway 17 to surround the main passageway itself. The toroidal element includes the secondary passageway 19 therein. In the preferred embodiment, the toroidal element is in turn advantageously formed with a plurality of perforated discs or washers 22 that are inserted and packed in the seat 23.

Thus the main passageway 17 is formed through the aligned central holes 24. The discs are further provided with a plurality of holes 25 disposed for the pre-established angular extension around the central hole to define segments of said secondary passageway. By suitably carrying out alignment or misalignment of the holes a greater or smaller obstacle to the fluid passage through the secondary passageway can be obtained.

It was found particularly advantageous for the valve performance that the holes 25 of each disc be formed with a first diameter over a first length and with a second diameter different from the first one over a second length, as clearly shown in FIG. 1, thus making the all ducts formed with alternated segments having the first and second diameters.

A pipe 26 forming said main passageway at the inside thereof is advantageously inserted in the passage formed with the central holes of the packed discs. As seen in chain line in FIG. 1, pipe 26 can have at least a portion thereof extending out of the packed discs so that part of the entrance is disposed close to the imaginary spherical surface identified by the ball element at the end of the central passageway. This allows the flow to be suitably guided when the valve is in the intermediate opening conditions. By making different extensions of only part of the pipe also particular paths can be obtained and arising of undesirable overpressure or negative pressure regions can be avoided in the valve.

Advantageously inserted in said disc seat is a suitably shaped plug 27 that is bored at least in register with the secondary passageway 19 and connects the surface of the ball element. The plug has an outer surface connected with the surface of the ball element that is designed to sealingly slide along the edge of the sealing element 18.

At this point it is apparent that the intended purposes are achieved. The valve made in accordance with the invention allows both fully open and fully closed positions to be present in a single valve, as well as a satisfactory regulation range. Also the problems concerning opening and closing transients present in known valves are eliminated. In addition, by suitably selecting the conformation of the secondary passageways it is possible to obtain a regulation range having regulation features with high differential pressures or lower differential pressures but a high useful regulation angle, before reaching the completely open position of the valve. By supplying a greater passage extension around the central passageway expansion of the gas is allowed, if wished.

Of course, the above description of an embodiment applying the innovative principles of the present invention is given by way of example only and therefore must not be considered as a limitation of the patent rights herein claimed. For example, passageways 19 can be holes, channels or more or less complicated labyrinths depending on the practical use and manufacture requirements.

If wished, other passageways or channels could be provided for connection between the secondary passageway and the main passageway (at spaced positions along the channel axis, for example) in order to allow a further fluid expansion.

What is claimed is:

1. A ball valve for fluids comprising a body provided with an inlet and an outlet and with an inner chamber in which a ball element having a main communication passageway passing through the ball element is rotatably received, the ball element being rotatable between an angular position at which the valve is fully closed, with said passageway being disposed substantially transverse to the inlet and outlet, and an angular position at which the valve is fully open, with said main passageway being aligned with the valve inlet and outlet to constitute a communication therebetween, the ball element comprising a secondary communication passageway of reduced section disposed laterally of said main communication passageway, the secondary passageway being designed to bring the valve inlet and outlet into communication with each other when said ball element is in a range of intermediate angular positions between said fully open and fully closed positions, wherein the secondary passageway is not aligned either the inlet or the outlet when the ball element is in the fully open position, the secondary passageway being formed by a plurality of packed discs received in a seat in said ball element, the discs being provided with a plurality of holes defining segments of said secondary passageway.

2. The valve as claimed in claim 1, characterized in that the secondary passageway comprises a plurality of paths for the fluid to generate an important pressure difference between the valve inlet and outlet when the ball element is in said range of angular positions.

3. The valve as claimed in claim 1, characterized in that the secondary passageway has a cross section extending at an angle around said main passageway.

4. The valve as claimed in claim 3, characterized in that said extension is limited to an angle included between 45° and 180° around the central passageway.

5. The valve as claimed in claim 3, characterized in that the secondary passageway has a cross section extending symmetrically with respect to a median plane transverse to the rotation axis of the ball element.

6. The valve as claimed in claim 3, characterized in that a plug is inserted in said seat of the discs, which plug is bored at least in register with the secondary passageway and connects the curved wall of the ball element.

7. The valve as claimed in claim 3, wherein said extension is limited to an angle of approximately 90° around the central passageway.

8. The valve as claimed in claim 1, wherein the discs are toroidal and are received in the seat with an axis coincident with the axis of the main passageway to surround said main passageway.

9. The valve as claimed in claim 8, wherein the holes of each disc are disposed over a pre-established angular extension around a central hole.

10. The valve as claimed in claim 9, characterized in that the holes of each disc are formed with a first diameter over a first length and with a second diameter different from the first one over a second length.

11. The valve as claimed in claim 9, characterized in that a pipe forming said main passageway at the inside thereof is inserted in the passageway formed by the central holes of the packed discs.

12. The valve as claimed in claim 11, characterized in that at least part of said pipe extends out of the packed discs.

13. The valve as claimed in claim 12, characterized in that said plug has an outer surface connected with the surface of the ball element, that is designed to sealingly slide along the edge of a sealing element surrounding the opening of the corresponding inlet or outlet into the chamber.

14. The valve as claimed in claim 1, characterized in that it further comprises a third passageway for connection between the main passageway and secondary passageway.

* * * * *